No. 737,850. PATENTED SEPT. 1, 1903.
J. KOŠTÁLEK.
FILTER.
APPLICATION FILED AUG. 7, 1902.
NO MODEL. 3 SHEETS—SHEET 1.

Witnesses. Inventor.
Josef Koštálek

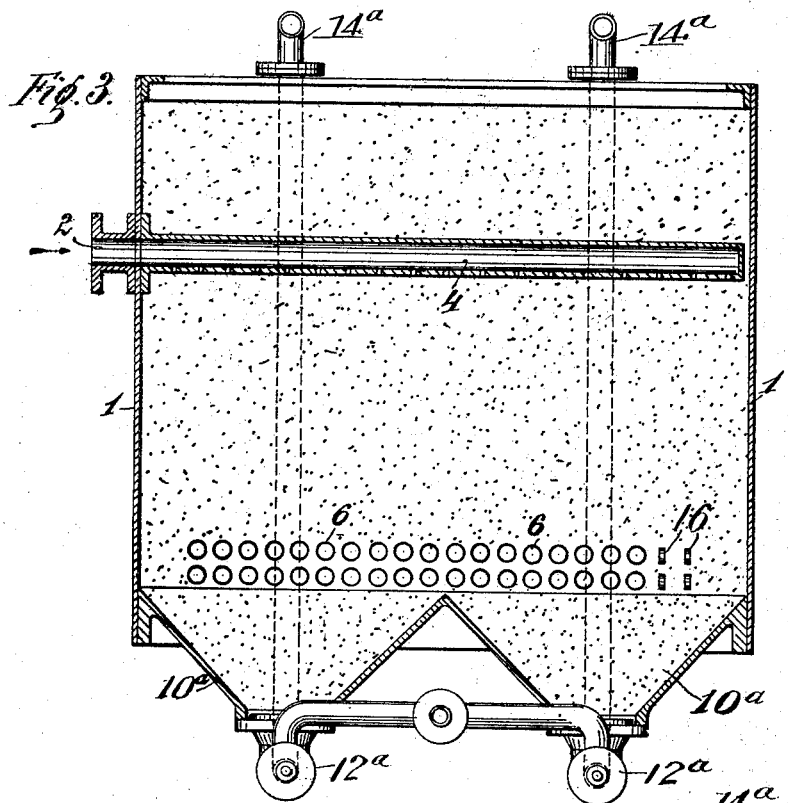
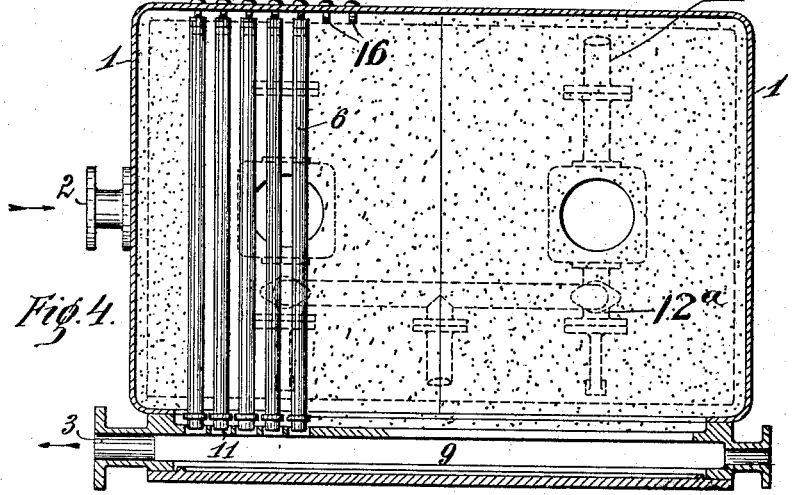

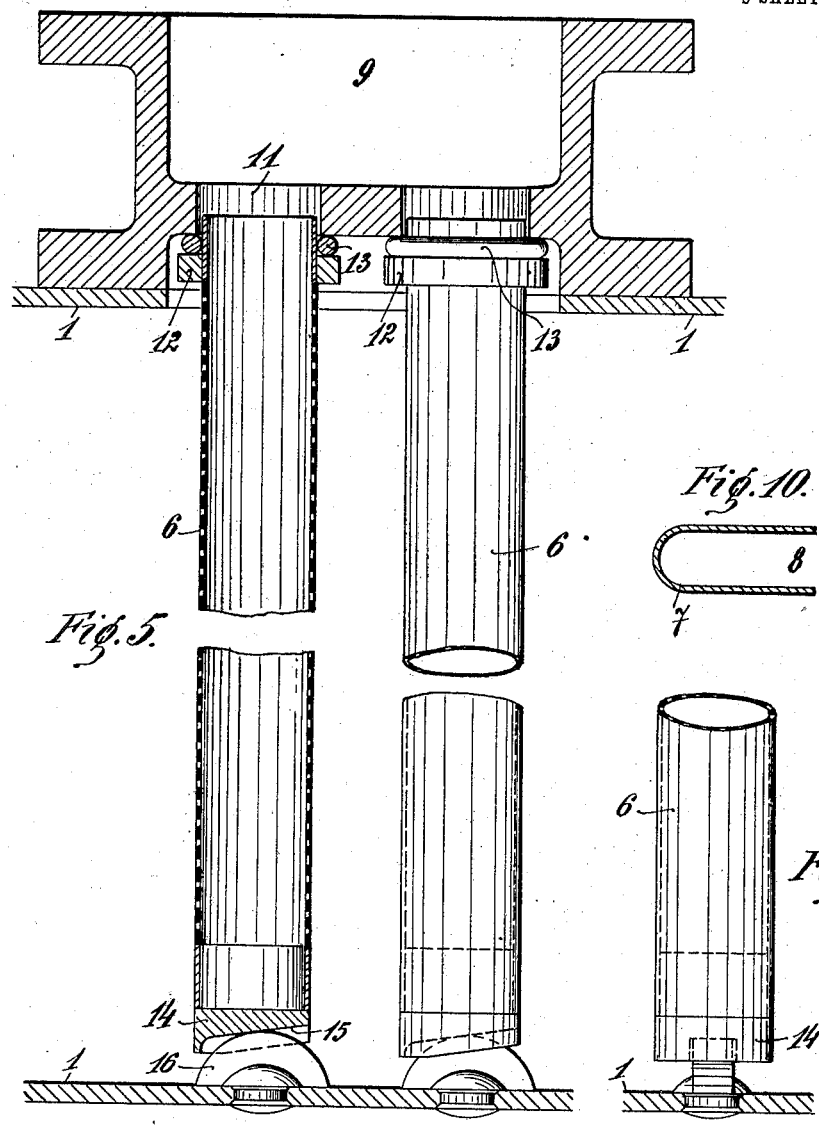

No. 737,850.  
Patented September 1, 1903.

UNITED STATES PATENT OFFICE.

JOSEF KOŠTÁLEK, OF PRAGUE-VINOHRADY, AUSTRIA-HUNGARY, ASSIGNOR TO SOCIETY AKCIOVÁ SPOLECNOST STROJIRNY DŘIVE BREITFELD, DANĚK I SPOL, (MASCHINENFABRIK-ACTIENGESELLSCHAFT, VORMALS BREITFELD, DANĚK & CO.,) OF KARLIN, AUSTRIA-HUNGARY.

FILTER.

SPECIFICATION forming part of Letters Patent No. 737,850, dated September 1, 1903.

Application filed August 7, 1902. Serial No. 118,747. (No model.)

*To all whom it may concern:*

Be it known that I, JOSEF KOŠTÁLEK, a subject of the Emperor of Austria, residing at Prague-Vinohrady, in the Kingdom of Bohemia, Austrian Monarchy, have invented a new and useful Filter, of which the following is a specification.

My invention relates to improvements in parallel filters in which the filtering material is traversed by the liquid at every point which is to be filtered with one and the same velocity and in one and the same direction, either horizontally or vertically; and the objects of my improvements are, first, to facilitate the taking out and laying in of the discharging and the inlet pipes; second, to provide a simple and efficient filter that will operate in the manner set forth.

I attain these objects by the mechanism illustrated in the accompanying drawings, in which—

Figure 1:
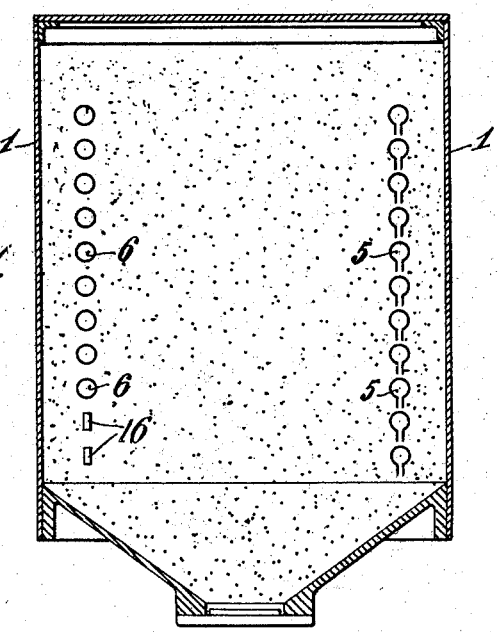
Figure 2:
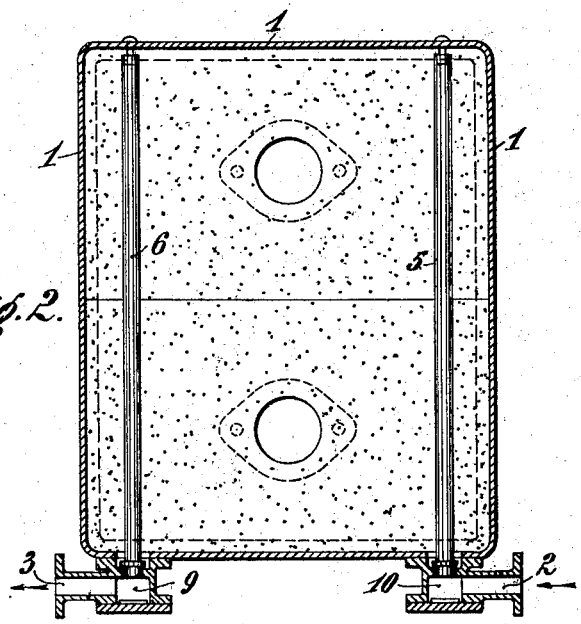

Figures 1 and 2 are respectively a vertical and a horizontal section of a parallel filter with a horizontal flow, and Figs. 3 and 4 are respectively a vertical and a horizontal section of a parallel filter with a vertical flow, constructed according to my invention. Figs. 5 and 6 are enlarged details explanatory of the method of mounting the tubes of the filter, so as to be readily removable and replaceable. Fig. 7 is an enlarged detail of one of the abutments upon which one end of the tubes rests. Figs. 8 and 9 are transverse sections of two forms of inlet-tubes; and Fig. 10 is a transverse section of an alternative form of discharge-pipe, such as shown in Figs. 1 and 3 of a former patent granted to me, as hereinafter stated.

Similar figures refer to similar parts throughout the several views.

Referring to the first four figures, 1 is a filtering-reservoir. It is filled with sand or similar filtering material, which is traversed by the liquid to be filtered—for instance, sugar-juices—either in a horizontal or in a vertical direction, but in every case so that the velocity of the flow of the liquid remains in every point the same. The juice or liquid to be filtered flows from the inlet-tubes 4 or 5 to the perforated discharge-tubes 6. The inner inlet-tubes are usually fed from fluid-chambers 10, Fig. 2, supplied through induction-passage 2, and the filtered liquid flows from the discharge-tubes into similar fluid-chambers 9, from whence it flows out by nozzle 3. The tubes are perforated or slit, as shown, and open at one end. The open end is provided with an iron or similar external collar or shoulder 12. The wall of the filter has apertures opening into the chambers 9 and 10 of size just sufficient to receive the shouldered ends of the tubes, the inner face of the wall forming a seat for such shoulder, between which and said seat is interposed a rubber gasket 13, as shown in Fig. 5. The opposite end of the tube is closed, for instance, by a stopper 14, which is simply plugged in and rests freely by its beveled outside face 15 upon the fixed wedging-abutment 16. The tube can therefore easily be lifted up and taken out of its place or replaced again and when in position will seal its joint by its own weight.

Instead of the cylindrical discharge-tubes 6 having perforated walls, as shown in Fig. 5, I may employ tubes 7 saddle-shaped in cross-section and opening downward, (see Fig. 10,) as shown in Letters Patent of the United States No. 709,712, granted me on the 23d day of September, 1902.

In Figs. 3 and 4 are shown conical bottoms 10ª, injectors 12ª, and pipes 14ª for cleaning the filter.

It is evident that so far as the device for removably securing the horizontal tubes is concerned my invention is applicable to other apparatuses, and hence I do not intend to limit it to employment in filters alone and shall employ that term in the ensuing claim only in a conventional sense.

What I claim as my invention, and desire to secure by Letters Patent, is—

In a filter, the combination of a main compartment, a fluid-inlet chamber at one end thereof, apertures through the wall between said fluid-chamber and the main compartment, a series of horizontal perforated tubes open and annularly shouldered at one end to enter said apertures and seat against the partition-wall, and closed and beveled at the other end, packing-gaskets between the shoulders and the wall, and wedging-abutments on the opposite wall upon which the adjacent beveled ends of the tubes rest; and a second series of discharge-tubes arranged in a plane parallel to said inlet series of tubes, and a discharge-chamber with which said discharge-tubes communicate.

In witness whereof I have hereunto set my hand in presence of two witnesses.

JOSEF KOŠTÁLEK.

Witnesses:
LADISLAV VOJACEK,
ARTHUR SCHRECK.